United States Patent
Nagata et al.

(10) Patent No.: US 11,548,059 B2
(45) Date of Patent: Jan. 10, 2023

(54) MOLD RELEASE AGENT FOR CORE

(71) Applicant: TOYOTA JIDOSHA KABUSHIKI KAISHA, Toyota (JP)

(72) Inventors: Yasutake Nagata, Nagoya (JP); Hirotsune Watanabe, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/474,505

(22) Filed: Sep. 14, 2021

(65) Prior Publication Data

US 2022/0143681 A1    May 12, 2022

(30) Foreign Application Priority Data

Nov. 9, 2020   (JP) .............................. JP2020-186471

(51) Int. Cl.
*B22C 3/00*        (2006.01)
(52) U.S. Cl.
CPC ...................................... *B22C 3/00* (2013.01)
(58) Field of Classification Search
CPC ....................................................... B22C 3/00
See application file for complete search history.

(56) References Cited

FOREIGN PATENT DOCUMENTS

| | | |
|---|---|---|
| CN | 106077443 A | * 11/2016 |
| JP | 2018-118302 A | 8/2018 |
| JP | 2019-18184 A | 2/2019 |

OTHER PUBLICATIONS

Merget, R., Bauer, T., Küpper, H., Philippou, S., Bauer, H., Breitstadt, R. and Bruening, T., 2001. Health hazards due to the inhalation of amorphous silica. Archives of Toxicology, 75(11-12), pp. 625-634. (Year: 2001).*

* cited by examiner

*Primary Examiner* — Kevin P Kerns
*Assistant Examiner* — Steven S Ha
(74) *Attorney, Agent, or Firm* — Oblon, McClelland, Maier & Neustadt, L.L.P.

(57) ABSTRACT

An inorganic mold release agent for a core that is applied to a surface of a core containing an aggregate and an inorganic binder, and the mold release agent for a core is a powder containing silica powder, which is applied in a powder form to the surface of the core.

3 Claims, 1 Drawing Sheet

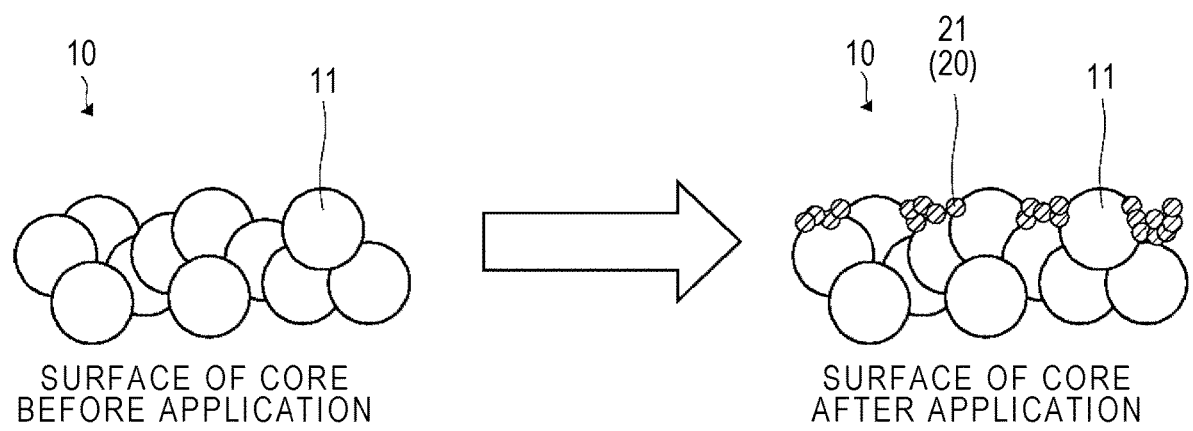

MOLD RELEASE AGENT FOR CORE

CROSS-REFERENCE TO RELATED APPLICATION

This application claims priority to Japanese Patent Application No. 2020-186471 filed on Nov. 9, 2020, incorporated herein by reference in its entirety.

BACKGROUND

1. Technical Field

The present disclosure relates to a mold release agent for a core.

2. Description of Related Art

Cores used for casting are formed from an aggregate such as sand using a binder. In this case, if a core is formed using an organic binder, tar, soot, offensive odor (gas), and the like are generated due to heat of a molten metal. Therefore, it is desirable to form a core using an inorganic binder.

On the other hand, since there are fine holes on the surface of the core, the molten metal enters the holes, and sand of the core adheres to the surface of a coarse material taken out from the core. Therefore, a process of removing the sand adhered to the surface of the coarse material is required. Therefore, in order to prevent sand from adhering to the surface of the coarse material, a mold release agent is applied to the surface of the core. However, when an organic mold release agent is used, tar, soot, offensive odor (gas), and the like are generated due to heat of the molten metal, and the above advantages of the core formed using an inorganic binder are impaired.

Here, Japanese Unexamined Patent Application Publication No. 2018-118302 (JP 2018-118302 A) describes an aqueous inorganic mold release agent that is applied to a core formed using an inorganic binder.

SUMMARY

However, as described in JP 2018-118302 A, since an aqueous mold release agent contains a solvent such as water, the solvent penetrates from the surface of the core thereinto, and the strength of the core decreases. In order to prevent the strength of the core from decreasing, in JP 2018-118302 A, an aqueous mold release agent is applied by spraying, but it is difficult to completely prevent the solvent from penetrating into the core.

The present disclosure has been made in order to solve such a problem, and an object of the present disclosure is to provide a mold release agent for a core that can more reliably minimize a decrease in the strength of the core.

The mold release agent for a core according to the present disclosure is an inorganic mold release agent for a core that is applied to a surface of a core containing an aggregate and an inorganic binder, and the mold release agent for a core is a powder containing silica powder, which is applied in a powder form to the surface of the core.

According to the mold release agent for a core according to the present disclosure, since silica powder is applied in the powder form without change as a mold release agent for a core, no solvent is used. Therefore, a decrease in the strength of the core, which is a concern with the mold release agent containing a solvent, does not occur. Thereby, it is possible to provide a mold release agent for a core that can more reliably minimize a decrease in the strength of the core.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a partially enlarged view schematically showing a surface of a core to which a mold release agent for a core according to Embodiment 1 of the present disclosure is applied.

DETAILED DESCRIPTION OF EMBODIMENTS

Embodiment 1

Hereinafter, Embodiment 1 of the present disclosure will be described with reference to the drawing. However, the present disclosure is not limited to the following Embodiment 1. In addition, in order to clarify the explanation, the following descriptions and drawings have been appropriately simplified.

FIG. 1 is a partially enlarged view schematically showing a surface of a core 10 to which a mold release agent for a core 20 according to Embodiment 1 is applied. The left side in FIG. 1 schematically shows the surface of the core 10 before the mold release agent for a core 20 is applied and the right side in FIG. 1 schematically shows the surface of the core 10 after the mold release agent for a core 20 is applied.

The core 10 is molded by filling the cavity of a mold with kneaded sand containing an aggregate such as sand and an inorganic binder and performing curing.

Examples of sand as an aggregate include mullite-based melting method artificial sand, mullite-based sintering method artificial sand, and natural silica sand.

Examples of inorganic binders include water glass. When an inorganic binder is used, it is possible to prevent the generation of tar, soot, offensive odor (gas), and the like during casting by using the organic binder.

The mold release agent for a core 20 is a powder made of an inorganic substance. In Embodiment 1, the mold release agent for a core 20 is a powder containing silica or fused silica (hereinafter simply referred to as "silica") powder. In addition, the powder particle size of the mold release agent for a core 20 is preferably smaller than the particle size of sand 11 forming the core 10. For example, the average particle size of silica of the mold release agent for a core 20 is about 11 μm, and the maximum particle size is 90 μm. Thereby, particles 21 of the mold release agent for a core 20 can enter fine irregularities and holes present on the surface of the core 10.

In addition, it is desirable that silica used as the mold release agent for a core 20 have an amorphous structure. Therefore, it is possible to prevent health damage caused by inhaling powder dust of the mold release agent for a core 20.

In addition, since the mold release agent for a core 20 is composed of only an inorganic substance and does not contain an organic substance, the advantage of the core 10 using an inorganic binder of preventing the generation of tar, soot, offensive odor (gas), and the like during casting is not impaired.

The left side in FIG. 1 schematically shows the surface of the molded core 10. As shown on the left side in FIG. 1, since there are fine irregularities and holes on the surface of the molded core 10, if casting is performed using the core without change, the molten metal enters the irregularities and holes, and the sand 11 derived from the core adheres to the surface of the casting. The formation of fine irregularities and holes on the surface of the core is more remarkable in the core 10 formed using an inorganic binder than in the core formed using an organic binder. Therefore, a process of removing the sand 11 adhered to the surface of the casting is required.

Therefore, in order to prevent the sand 11 from adhering to the surface of the casting, the mold release agent for a core 20 is applied to the surface of the core.

The right side in FIG. 1 schematically shows the surface of the core 10 to which the mold release agent for a core 20 is applied. As shown on the right side in FIG. 1, it is possible to prevent the particles 21 of the mold release agent for a core 20 from entering fine irregularities and holes on the surface of the core 10 and prevent the molten metal from entering fine irregularities and holes on the surface of the core 10.

In addition, when the mold release agent for a core 20 is applied to the surface of the core 10, powder particles 21 of the mold release agent for a core 20 impart a fine irregular structure on the surface of the core 10. The fine irregular structure referred to here is an irregular structure smaller than that of the fine irregularities and holes originally on the surface of the core 10. Thus, it is thought that the fine irregular structure imparts a lotus effect on the surface of the core 10, and reduces wettability of the molten metal to the surface of the core 10. Thereby, it is thought that it is possible to prevent the casting from sticking to the surface of the core 10 and prevent the sand 11 derived from the core 10 from adhering to the surface of the casting.

The mold release agent for a core 20 in a powder form is applied to the surface of the core 10 without using a solvent. Specifically, for example, the powder mold release agent for a core 20 is adhered to a brush, and the mold release agent for a core 20 is applied to the surface of the core 10 using the brush. In addition, the mold release agent for a core 20 may be applied to the surface of the core 10 using a spray. In addition, the mold release agent for a core 20 may be applied to the surface of the core 10 using a device used for powder coating. Examples of devices used for powder coating include a powder coating device using a powder flow tank described in Japanese Unexamined Patent Application Publication No. 2019-18184 (JP 2019-18184 A).

According to the mold release agent for a core 20 according to Embodiment 1 described above, since a silica powder is applied in a powder form without change as the mold release agent for a core 20, no solvent is used. Therefore, a decrease in the strength of the core 10, which is a concern with the mold release agent containing a solvent, does not occur. Thereby, it is possible to provide the mold release agent for a core 20 that can more reliably minimize a decrease in the strength of the core 10.

In addition, since the mold release agent for a core 20 is inorganic, the advantage of the inorganic core 10 that generation of tar, soot, offensive odor (gas), and the like due to heat of the molten metal do not occur is not impaired.

Embodiment 2

Next, the mold release agent for a core 20 according to Embodiment 2 of the present disclosure will be described. The mold release agent for a core 20 according to Embodiment 2 further contains magnesium hydroxide powder in addition to silica powder. The particle size of the silica powder and the particle size of the magnesium hydroxide powder are preferably smaller than the particle size of the sand 11 forming the core 10. For example, the particle size of the magnesium hydroxide powder has a distribution of about 1 μm to about 10 μm, and the peak particle size is about 3.7 μm. Thereby, the particles 21 of the mold release agent for a core 20 can enter fine irregularities and holes present on the surface of the core 10.

Silica powder has a property of powder particles aggregating together and a lump being easily formed. Therefore, even if the mold release agent for a core 20 composed of only silica powder is applied to the core 10, there is a problem of an adhesive force with respect to the surface of the core 10 being weakened and the powder easily scattering. However, when the mold release agent for a core 20 contains magnesium hydroxide powder in addition to silica powder, it is possible to inhibit formation of a silica powder lump. Therefore, it is possible to improve the adhesive force of the mold release agent for a core 20 with respect to the surface of the core 10.

In addition, since magnesium hydroxide is a substance used as a food additive, a cosmetic filler, or the like, there is little risk of causing health damage.

In addition, even if only magnesium hydroxide powder is applied as the mold release agent for a core 20 to the surface of the core 10, it is possible to prevent the molten metal from sticking to the surface of the core 10. When powder magnesium hydroxide ($Mg(OH)_2$) applied to the surface of the core 10 is heated by the molten metal, it is decomposed into MgO and $H_2O$. Then, due to water vapor generated from the magnesium hydroxide, a thin film with a water vapor gas is formed on the surface of the core 10. Thereby, it is thought that it is possible to prevent the casting from sticking to the surface of the core 10 and prevent the sand 11 derived from the core 10 from adhering to the surface of the casting.

Therefore, when the mold release agent for a core 20 further contains magnesium hydroxide powder in addition to silica powder, in addition to a lotus effect of the silica powder, according to an effect of the film with water vapor formed by the magnesium hydroxide powder during casting, it is possible to prevent the casting from sticking to the surface of the core 10.

In addition, the mold release agent for a core 20 preferably contains 0 parts by mass to 50 parts by mass of the magnesium hydroxide powder with respect to a total of 100 parts by mass of the silica powder and the magnesium hydroxide powder. Therefore, an effect of preventing the molten metal from sticking to the core 10 according to the mold release agent for a core 20 is preferable.

In addition, the mold release agent for a core 20 preferably contains 50 parts by mass of the magnesium hydroxide powder with respect to a total of 100 parts by mass of the silica powder and the magnesium hydroxide powder. Therefore, an effect of preventing the molten metal from sticking to the core 10 according to the mold release agent for a core 20 is more preferable.

According to the mold release agent for a core 20 according to Embodiment 2 described above, when the mold release agent for a core 20 further contains magnesium hydroxide powder in addition to silica powder, it is possible to inhibit formation of a silica powder lump, and it is possible to improve an adhesive force of the mold release agent for a core 20 with respect to the surface of the core 10.

In addition, when the mold release agent for a core 20 further contains magnesium hydroxide powder in addition to silica powder, in addition to a lotus effect of the silica powder, according to an effect of the film with water vapor formed by the magnesium hydroxide powder during casting, it is possible to prevent the casting from sticking to the surface of the core 10.

In addition, when the mold release agent for a core 20 contains 0 parts by mass to 50 parts by mass of the magnesium hydroxide powder with respect to a total of 100 parts by mass of the silica powder and the magnesium hydroxide powder, an effect of preventing the molten metal from sticking to the core 10 according to the mold release agent for a core 20 is preferable.

In addition, since the silica used as the mold release agent for a core 20 has an amorphous structure, it is possible to prevent health damage caused by inhaling powder dust of the mold release agent for a core 20.

Here, the present disclosure is not limited to the above embodiments, and can be appropriately changed without departing from the spirit.

What is claimed is:

1. An inorganic mold release agent for a core that is applied to a surface of the core containing an aggregate and an inorganic binder,
    wherein the mold release agent for the core is a powder containing silica powder and magnesium hydroxide powder, and is applied in a powder form to the surface of the core.

2. The mold release agent for the core according to claim 1, containing up to 50 parts by mass of the magnesium hydroxide powder with respect to a total of 100 parts by mass of the silica powder and the magnesium hydroxide powder.

3. The mold release agent for the core according to claim 1, wherein the silica has an amorphous structure.

* * * * *